Dec. 22, 1925.

A. TICKLE 1,566,931

PISTON

Filed July 3, 1925

WITNESSES
H. J. Walker
J. T. McAuliffe

INVENTOR
Arthur Tickle
BY
ATTORNEYS

Patented Dec. 22, 1925.

1,566,931

UNITED STATES PATENT OFFICE.

ARTHUR TICKLE, OF BROOKLYN, NEW YORK.

PISTON.

Application filed July 3, 1925. Serial No. 41,366.

*To all whom it may concern:*

Be it known that I, ARTHUR TICKLE, a citizen of the United States of America, and a resident of the city of New York, borough of Brooklyn, in the county of Kings and State of New York, have invented a new and Improved Piston, of which the following is a description.

My invention relates to a piston for reciprocating engines and has for an object to provide a piston so formed as to permit escape from the piston and to the exterior of the cylinder of any steam leaking to the backs of the piston rings.

An important object of the invention also is to provide a follower and fastening means therefor which will effectively prevent leakage of steam beneath the follower.

The nature of my invention and its distinguishing features and advantages will clearly appear as the description proceeds.

Reference is to be had to the accompanying drawings forming a part of this specification, it being understood that the drawings are merely illustrative of one example of the invention.

Figure 1:
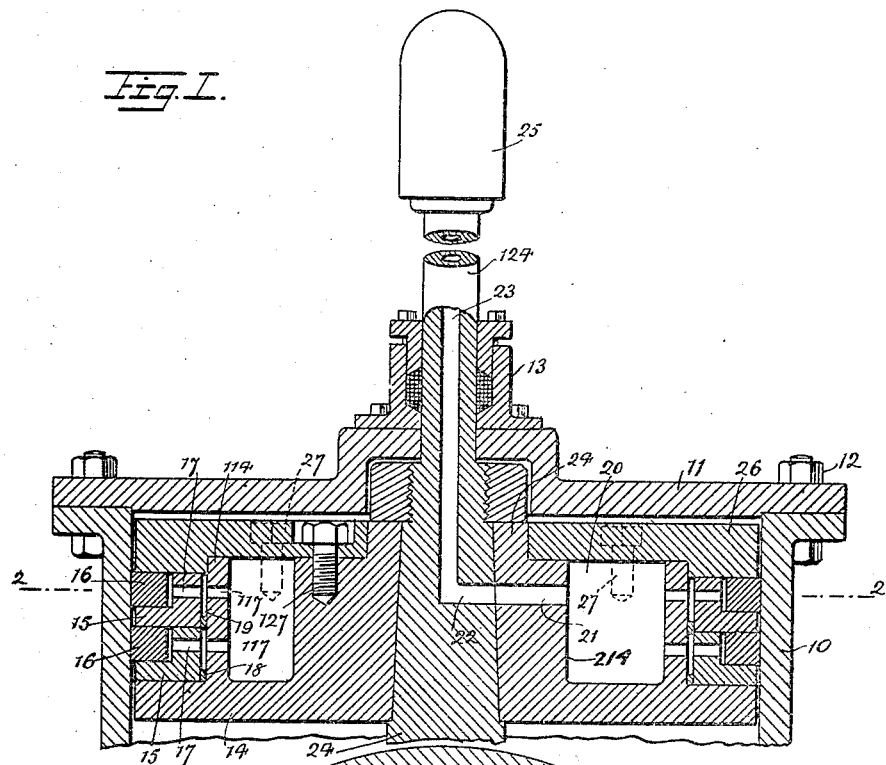
Figure 1 is a vertical section of a piston embodying my invention and a portion of a cylinder.
Figure 2:
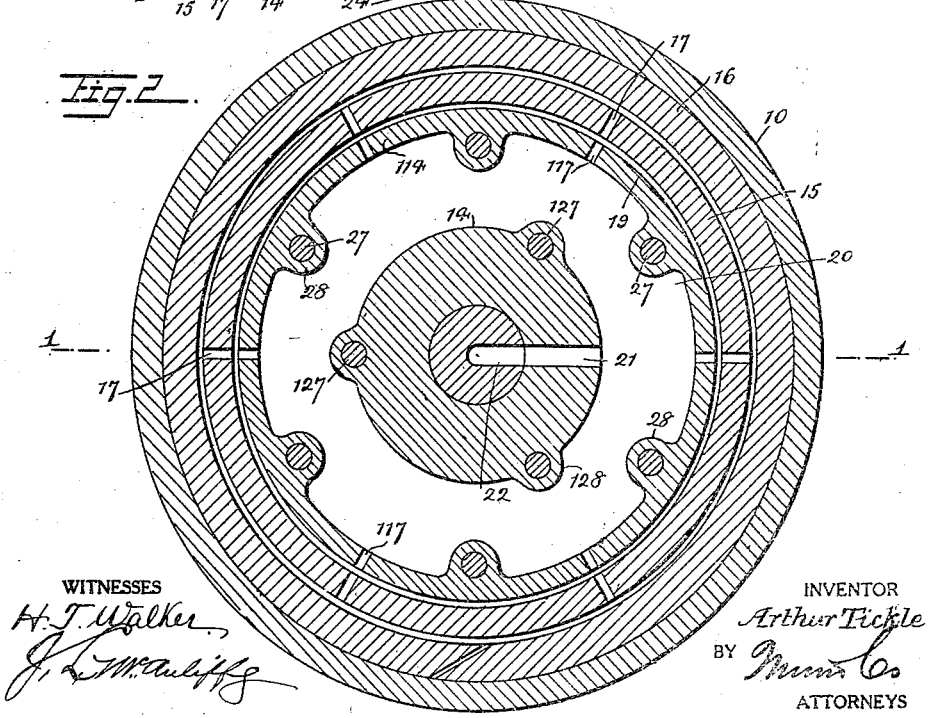
Figure 2 is a transverse section on the line 2—2, Figure 1.

In carrying out my invention in practice in accordance with the illustrated example, the cylinder 10 may have in its essentials the usual construction including a head 11 modified as hereinafter described. Said head is secured by bolts 12 and provided in carrying out my invention with a stuffing box 13. The numeral 14 indicates the piston; 15, the bull rings; and 16, the expansible piston rings. In carrying out my invention and in order to provide for the escape of any steam leaking to the back of the piston rings, the bull rings 15 have radial or approximately radial holes 17, registering with which are radial holes 117 in the piston 14. The bull rings are spaced from the outer periphery of the piston 14 by any suitable annular element 18, whereby to provide a narrow annular space 19 between the piston and the bull rings to insure passage of the steam from the passages or ports 17 to the passages or ports 117. Steam passing radially inward through the ports 17, 117 from the backs of piston rings 16 and from chamber 19 discharges to an ample annular chamber 20 formed in the piston 14, the provision of the chamber 20 resulting in an annular flange 114 integral with the piston and forming the outer wall of the chamber 20, said flange 114 having the passages 117. The steam received in the chamber 20 finds escape from said chamber through a port 21 extending radially outward through the registering port 22 to and through an axial steam passage 23 in the extension 124 of the piston rod 24, said extension 124 passing outwardly through head 11 of cylinder 10 and through the stuffing box 13 on said head. The steam escaping at the exterior of the cylinder from passage 23 may be conducted to any desired point or device, there being conventionally indicated in the present instance a known form of pop-valve 25 on the extension 124 from which pop-valve accumulated steam may escape.

The follower 26 of piston 14 forms the front wall of steam chamber 20. Respecting said follower it is well to say that the means ordinarily employed for securing the follower in position is an annular series of screws passing through the follower and screwing into the body of the piston 14. In practice, said screws, here designated by the numeral 27, are remote from the inner periphery of the follower and nearer the outer periphery for which reason the tightening up of the screws (27) frequently results in the looseness of the follower at the inner periphery permitting steam to enter to the back of the follower between the same and the boss 214 of piston 14, which enters the bore or open center of follower 26. In order to overcome the defect referred to, and insure against the passage of steam to the back of the follower 26 between said follower and the boss 214, I provide a second series of screws designated 127 which pass through the follower 26, adjacent the inner periphery thereof and screwing into the body of the piston radially inward from the screws 27, the screws 127 thus preventing the formation of a steam space at the inner periphery of the follower 26 due to the tightening up of the screws 27.

I would state furthermore that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. An assemblage of the class described, including a cylinder, a piston operating in said cylinder, and a piston rod carrying the piston, said piston rod having a member extending through the cylinder to the exterior thereof, said piston including a central boss receiving the piston rod, and an annular flange co-operating with said boss to define a steam chamber, bull rings disposed outwardly of said flange, and piston rings mounted in the bull rings, annular members spacing the bull rings from the flange, and providing a restricted annular chamber between the bull rings and the flange, said bull rings and flange having registering ports therein for conducting steam from behind the piston rings to the chamber defined by the boss and flange, and passageways for conducting said steam from the chamber through the piston rod extension to the outer air.

2. A device of the class set forth in claim 1, wherein a pop valve controls the escape of steam from the passage in the piston rod extension.

3. A piston formed with a central boss, and a flange outwardly of said boss, a follower, an annular series of securing devices holding the follower to the flange, and a second annular series of securing devices holding the follower to the boss, said boss and flange defining an annular steam chamber, bull rings between the follower and piston, arranged exteriorly of the flange, and means for conducting steam through the bull rings and flange to the annular steam chamber.

ARTHUR TICKLE.